United States Patent [19]

Sasa

[11] Patent Number: 4,801,178
[45] Date of Patent: Jan. 31, 1989

[54] JOINT STRUCTURE FOR AXLE HOUSING BALL-END

[75] Inventor: Naomichi Sasa, Fujisawa, Japan
[73] Assignee: Isuzu Motors Limited, Tokyo, Japan
[21] Appl. No.: 6,139
[22] Filed: Jan. 23, 1987

[30] Foreign Application Priority Data

Jan. 30, 1986 [JP] Japan .................................. 61-16691
Jan. 30, 1986 [JP] Japan .................................. 61-16692

[51] Int. Cl.$^4$ ........................................... B60K 17/30
[52] U.S. Cl. ................................. 301/124 H; 180/259
[58] Field of Search ............. 301/124 R, 124 H, 125, 301/126, 130; 180/258, 259

[56] References Cited

U.S. PATENT DOCUMENTS

| | | | |
|---|---|---|---|
| 2,264,785 | 12/1941 | Ash | 180/259 X |
| 2,598,876 | 6/1952 | Ash | 180/259 X |
| 4,119,167 | 10/1978 | Yamada et al. | |
| 4,337,953 | 7/1982 | Ikeda et al. | 301/124 H X |

FOREIGN PATENT DOCUMENTS 2931764 2/1981 Fed. Rep. of Germany .
2510046 1/1983 France .
56-24226 3/1981 Japan .
59-37386 10/1984 Japan .
59-37387 10/1984 Japan .

Primary Examiner—James B. Marbert
Attorney, Agent, or Firm—Browdy & Neimark

[57] ABSTRACT

In a joint structure for an axle, the outer race of a constant-velocity joint is formed at the end of an axle shaft disposed inside a hollow spherical portion of a tubular axle, a seal fitted to a knuckle is disposed in such a manner as to cross the axes of a pair of king-pins disposed in a vertical direction, the fitting position of the seal is substantially the largest diameter position of the hollow spherical portion of the tubular axle, the knuckle consists of a knuckle portion supported rotatably by the king-pin on the upper side and a knuckle portion supported rotatably by the king-pin on the lower side, and the seal is clamped between the knuckle portion on the upper side and the knuckle portion on the lower side. Accordingly, the annular seal is slidable substantially to the part of the hollow spherical portion with the swinging movement of the knuckle, which part is the connection of the hollow spherical portion with the end of the tubular axle, and a steering angle can thus be increased.

4 Claims, 5 Drawing Sheets

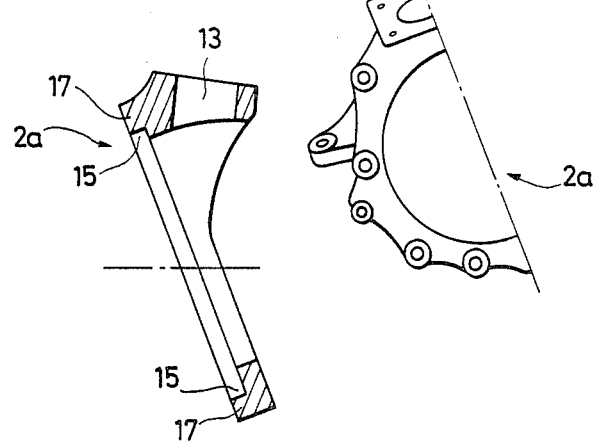
FIG. 2A
FIG. 2B
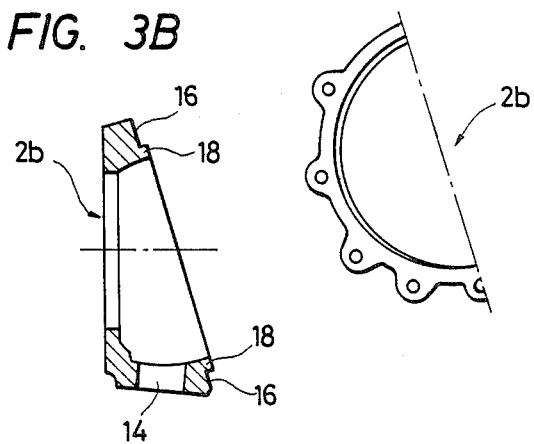
FIG. 3A
FIG. 3B

JOINT STRUCTURE FOR AXLE HOUSING BALL-END

BACKGROUND OF THE INVENTION

1. Field of the Invention;

The present invention relates generally to a joint structure for an axle, and more particularly to a joint structure for an axle in a driving axle structure with a steering device.

2. Description of the Prior Art;

According to a conventional arrangement, a driving axle structure equipped with a steering device includes generally a hollow spherical portion formed at the end portion of a non-rotatable tubular axle extending in the transverse direction of the car, a non-rotatable hollow axle casing disposed on the wheel side and a knuckle mounted rotatably on the spherical surface of the hollow spherical portion by a pair of king pins fitted to the end surface of the axle casing and positioned on the diameter substantially in the vertical direction relative to the hollow spherical portion and a king pin bearing supporting pivotally each of the king pins. A constant-velocity joint is disposed inside the space defined by the hollow spherical portion, the axle casing and the knuckle. Moreover, the outer race of the constant-velocity joint is coupled to a drive shaft disposed rotatably inside the axle casing on the wheel side while its inner race is coupled to an axle shaft supported rotatably inside the tubular axle on the car body side. In the driving axle structure having this conventional arrangement, a dust-tight annular seal is mounted to the knuckle in such a manner as to come into sliding contact with the spherical surface of the hollow spherical portion and to prevent any dust from entering the constant-velocity joint. According to this conventional arrangement, there is a limitation to the annular seal in that the seal can hardly be disposed ideally to the hollows spherical portion of the tubular axle because the tip of the knuckle, or in other words, the dust-tight seal, becomes an obstacle. The hollow spherical portion in the driving axle structure is a member which bears the load as part of the axle. For this reason, the conventional configuration of a rotary body housing an axle shaft which is worked by means of a lathe does not allow for any reduction in the diameter of the neck i.e. from the viewpoints of strength, so that a seal sliding surface necessary for satisfactory steering cannot be ensured and the maximum steering angle possible is therefore restrained up to about 30°.

A limitation imposed on the disposition of the constant-velocity joint is as follows: The tip of the hollow spherical portion formed at the end of the tubular axles butts against or interferes with the spherical surface of the outer race of the constant-velocity joint having an increased diameter so that the angle of rotation of the drive shaft disposed inside the axle casing and hence the angle of rotation of the knuckle relative to the hollow spherical portion, that is, the steering angle, is limited to approximately 30°. In practice, however, the internal structure of the constant-velocity joint can permit the steering angle of up to about 40°, and an improvement is therefore desired in the disposition of the annular seal and the constant-velocity joint so as to proportionally increase the steering angle.

For the above-described reason, the prior art discloses an ellipitic-seal structure in which a surface of each knuckle on which a seal is mounted is inclined with respect to the hollow spherical portion of an associated tubular axle. This type of structure is disclosed, for example, in the specifications of Japanese Utility Model Publication No. 37386/1984 and 37387/1984.

First of all, a diagrammatic description will be made with respect to a front-wheel support device for a front drive vehicle described in Japanese Utility Model Publication No. 37386/1984. Either an oil seal member or an oil seal protection member is so formed as to have an axial length greater on the rear side than on the front side in the direction of movement of the vehicle when a knuckle housing is mounted. The seal of this prior art is disposed around a king-pin for pivoting the knuckle housing and a trunnion socket in an inclined manner at a predetermined angle, so that, when a vehicle is moved straight, a flat surface including the seal edge of either the oil seal member or the oil seal protection member is disposed closer to the shaft of the trunnion socket on the front side than on the rear side. In this front-wheel support device for a front drive vehicle, the seal is formed in a special shape so as to increase the steering angle. However, even if the seal is formed in such a special shape, it is not necessarily satisfactory in respect of its strength, sealing characteristics and durability. In addition, this type of seal is difficult to produce and of no practical use, thus leading to various problems.

In the second place, a diagrammatic description will be made with respect to an oil seal device for a front-wheel support of a front drive vehicle described in the specification of Japanese Utility Model Publication No. 37387/1984. Referring to an oil seal member in this prior art, a rubber-made seal body has an equal width along its entire circumference in a natural state, and a circumferential groove of a L-shaped in section is formed from a mounting flange of the seal body to an arm portion perpendicular to the mounting flange. A reinforced flange member of a metal-made cylindrical flange body has a cut surface on the cylindrical side, such cut surface being inclined with respect to a flange surface, and is adherently engaged with the circumferential groove in a state wherein this groove is under an elastic tension. The reinforced flange member is also disposed around a king-pin for pivoting the knuckle housing and the trunnion socket in an inclined manner at a predetermined angle, so that, when a vehicle is moved straight, a flat surface including the edge of the annual seal is positioned nearer the trunnion socket on the front side than on the rear side. As in the case of the above-described example, this oil seal device for the front-wheel support of a front drive vehicle needs a seal with a special shape, and thus there is a problem in that the seal provided may not necessarily be satisfactory from the viewpoint of strength, sealing characteristics and durability, nor with respect to considerations regarding the production of the seal.

Heretofore known drive axles equipped with a steering device include the arrangement which is opposite to the conventional arrangement described above or in other words, the arrangement wherein the disposition of the constant-velocity joint is reversed. This constant-velocity joint is disposed inside the space defined by the hollow spherical portion at the end of the tubular axle, the axle casing and the knuckle fixed to the axle casing. However, the inner race of the constant-velocity joint is coupled to the drive shaft disposed rotatably inside the axle casing on the wheel side while the outer race of the constant-velocity joint is coupled to the axle shaft supported rotatably inside the tubular axle on the car body side. This type of joint structure for an axle housing ballend is disclosed, for example, in the specification of Japanese Patent Laid-open No. 24226/1981. A follower steering shaft of the type disclosed in the above-mentioned specification will hereinafter be described with reference to FIG. 6.

Referring to FIG. 6, the follower steering shaft is essentially constituted by three components which can be separated from one another: a shank 71 coupled to a differential unit; a constant-velocity joint 72; and a steering shaft 74 for driving a boss or a sun gear (not shown) within a planetary unit. The constant-velocity joint 72 includes a spherical external coupling member 75 as an outer race mounted on one end of the shank 71 and an internal coupling member 77 as an inner race mounted on a corresponding end of the steering shaft 74. A bellows 73 hermetically seals the inner chamber of the constant-velocity joint 72, the bellows being detachably mounted on the external coupling member 75 of the constant-velocity joint 72, and a neck 76 of the bellows 73 being maintained in airtight contact with the steering shaft 74 for free movement along the axis thereof. The bellows 73 has an axial residual stress, and is therefore formed strongly enough to be extended to its maximum axial length. The constant-velocity joint 72 equipped with the bellows 73 can be removed without the need to release it. In such driving axles equipped with a steering device, however, bellows 73 as the dust-tight seal are interposed between a spherical external joint member 75 as the outer race of the constant-velocity joint 72 and a drive shaft 74, though the drive shaft 74 of the constant-velocity joint 72 having a reduced diameter is positioned on the wheel side, in order to prevent instrusion of dust and the like into the constant-velocity joint 72. Therefore, since the tip of the tubular axle 78 butts against or interferes with the outer peripheral surface of the bellows 73 having an increased diameter, the angle of ratation of the drive shaft disposed inside the axle casing and hence the angle of ratation of the knuckle to the tubular axle 78, that is, the steering angle, is limited in the same way as described above.

SUMMARY OF THE INVENTION

It is an object of the present invention to provide a joint structure for an axle, which solves the above-described problems and improve the structure relating to knuckles, a tubular axle and king-pins, increaseing the inflective angle of each joint with respect to the hollow spherical portion of the respective tubular axle, that is, the steering angle, and yet of ensuring the strength of the axle.

It is another object of the present invention to provide a joint structure for an axle, in which the annular seal mounted on each knuckle is disposed to obliquely cross the axis connecting king-pin bearings which rotatably support the respective upper and lower king-pins, the position of the annular dust-guard seal with respect to a steering angle is set to the middle position of the slide surface of the hollow spherical portion of the tubular axle, thereby ensuring response to a steering angle needed when large wheels are used.

It is another object of the present invention to provide a joint structure for an axle capable of reducing the interference produced between the hollow spherical portion at the end of the axle shaft and the tubular axle during a steering operation, and yet increasing the steering angle of the wheels, thereby reducing the turning radius of a vehicle and improving the steerability of the vehicle when making sharp turns.

It is another object of the present invention to provide a joint structure for an axle, in which an annular seal mounting position is set to a position corresponding to the substantial largest diameter of the hollow spherical portion of the tubular axle, and in which, during assembly, the annular seal can be removed from the hollow spherical portion by virtue of its own flexibility, and thus assembly is enabled without the need to partially cut annular seal rubber or its retainer.

It is another object of the present invention to provide a joint structure for an axle, in which a knuckle is obliquely divided into a knuckle member including an upper king-pin bearing hole and a knuckle member including a lower king-pin bearing hole, the annular seal being firmly clamped between the knuckle member on the upper side and the knuckle member on the lower side, and the respective knuckle members being easily dissasembled without the need to pull the king-pins out of the tubular axle.

It is another object of the present invention to provide a joint structure for an axle, in which a king-pin seal is disposed around at least one of the king-pin bearings.

It is a further object of the present invention to provide a joint structure for an axle, in which, when the annular dust guard seal removes dried mud from the spherical portion, physical resistance can be reduced because the seal is arranged to obliquely scrape against the mud, and in which the annular seal need not be formed into a special shape, and yet the annular seal suffers no problems from the viewpoint of strength, sealing characteristics and durability, nor with respect to considerations regarding the production of the annular seal, the knuckle being capable of moving freely on the spherical portion since the annular seal is not hindered by the tubular axle.

It is a still further object of the present invention to provide a joint structure for an axle, which is capable of preventing the breakage and damage of large or expensive devices or components by utilizing a particular small member of a drive shaft connected to a constant-velocity joint as a mechanical safety device with respect to torque.

It is an additional object of the present invention to provide a joint structure for an axle, in which each end of the axle shaft disposed in the hollow spherical portion of the tubular axle constitutes an outer race of a constant-velocity joint.

BRIEF DESCRIPTION OF THE DRAWINGS

FIG. 2 is a perstective view schematically showing an upper knuckle member of a knuckle shown in FIG.1;

FIG. 2B is a cross-sectional view of the upper knuckle member shown in FIG. 2A;

FIG. 3A is a perspective view schematically showing a lower knuckle member of the knuckle shown in FIG. 1;

FIG. 3B is a cross-sectional view of the lower knuckle member shown in FIG. 3A;

DETAILED DESCRIPTION OF THE EMBODIMENT

An embodiment of a driving axle structure with a steering device in accordance with the present invention will be described below in detail with reference to the accompanying drawings.

Figure 1:
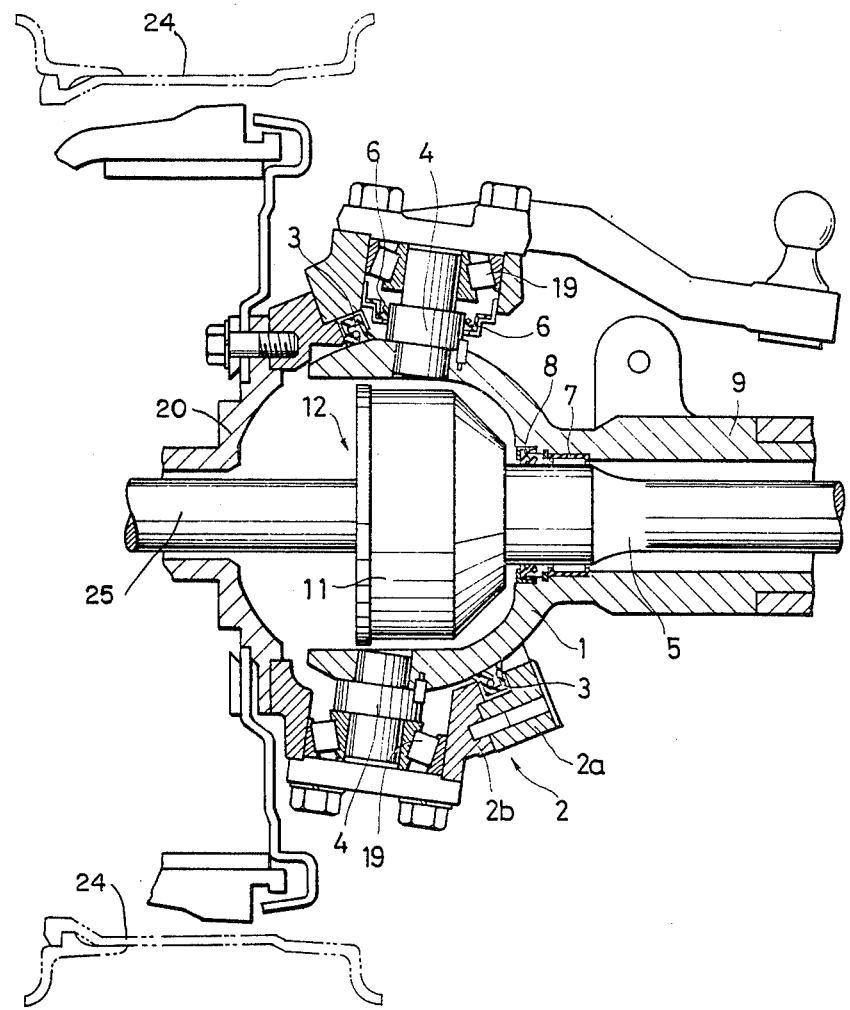
FIG. 1 is a partial cross-sectional view of a joint structure for an axle, which is applied to a driving axle structure with a steering device in accordance with the present invention.

FIG. 1 shows a preferred embodiment of a joint structure for an axle in accordance with the present invention. Referring to the illustrated joint structure, a hollow spherical portion 1 is formed at the end of a tubular axle 9, and an annular seal 3 made of rubber, felt or the like mounted on a knuckle 2 is maintained in contact with the hollow spherical portion 1, thereby preventing foreign matter from entering the interior of the joint structure. This annular seal 3 is disposed to obliquely cross the vertical axis connecting king-pin bearings 19 for ratatably supporting upper and lower king-pins 4, thereby to keep the annular seal 3 at an ideal location. When the knuckle 2 swings about the king-pins 4, the annual seal 3 may perform its sealing function while it is hermetically sliding over the hollow spherical portion 1.

This constant-velocity joint 12 is disposed inside the space defined by the hollow spherical portion 1 at the end of the tubular axle 9, the axle casing 20 and the knuckle 2 fixed to the axle casing 20. However, the inner race of the constant-velocity joint 12 is coupled to the drive shaft 25 disposed rotatably inside the axle casing 20 on the wheel 24 side while the outer race 11 of the constant-velocity 12 joint is coupled to the axle shaft 5 supported rotatably inside the tubular axle 9 on the car body side.

An axle shaft 5 is supported by a bearing 7. An oil seal 8 which is radially tightened by a lip is capable of hermetically sealing a rotating or reciprocally movable portion, and prevents differential-gear lubricating oil from entering the inner chamber of the constant-velocity joint. Since the interference produced between the root portion of the hollow spherical portion to the tubular axle 9 and the portion of the knuckle 2 provides limitations with respect to the length of a portion of the knuckle extending from the respective king-pins 4 to the exterior, the portion of the shaft connected to the constant-velocity joint 12 which portion interfer with the terminal end of the hollow spherical portion 1 formed at the end of the tubular axle 9 preferably has a structure as thin as possible in order to ensure a sufficient area in which the annular seal 3 can be moved. Since the constant-velocity joint 12 is arranged so as to dispose the thinnest portion of the shaft at an interference portion, it is effective from the viewpoint of the arrangement structure of the constant-velocity joint 12 that the constant-velocity joint 12 is arranged in a direction opposite to a normal structure, that is, the outer race 11 of the constant-velocity joint 12 is mounted on each end of the axle shaft 5. In addition to this, if the thinnest portion of the shaft of the constant-velocity joint 12 is formed in such a manner that it is twisted off at the time of application of an excessive power input, it is possible effectively to protect other expensive components.

In addition, in order to effectively utilize the area of the slide surface of the hollow spherical portion 1 on which the annular seal 3 is slided, it is preferable that the annular seal 3 is located at the middle position of the slide surface while a vehicle is moving straight forward. For this reason, in order to ideally dispose the annular seal 3 while it has a shape easy to produce and a true circle enabling positive performance of its function are maintained, it is preferable that the annular seal 3 is disposed at an ideal position corresponding to upper and lower substantial middle portions by taking notice of the fact that the upper and lower portions of the annular seal 3 is not substantially moved while the knuckle 2 is swinging. For example, as shown in FIG. 1, the annular seal 3 may be arranged to obliquely cross the axis connecting the upper and lower king-pins 4.

The structure of the embodiment in which the annular seal 3 is interposed between the two-piece knuckle 2 will be described below with reference to FIGS. 1, 2A, 2B, 3A and 3B.

Referring to FIG. 1 showing a structure in which the annular seal 3 is secured at the location, the knuckle 2 is constituted by upper and lower divisions: knuckle members 2a and 2b. The annular seal 3 is sandwiched between the knuckle members 2a and 2b, whereby the annular seal 3 may be firmly mounted.

FIGS. 2A, 2B, 3A and 3B shows the details of the structure in which the knuckle 2 is divided into the knuckle member 2a and 2b.

FIG. 2A is a perspective view of the knuckle member 2a, that is, the knuckle member including an upper king-pin hole 13, with FIG. 2B being a cross-sectional view of the member 2a shown in FIG. 2A. FIG. 3A is a perspective view of the knuckle member 2b, that is, the lower knuckle member, with FIG. 3B being a cross-sectional view of the member 2b shown in FIG. 3A. The upper king-pin hole 13 in the knuckle member 2a may be machined together with a king-pin hole 14 in the knuckle member 2b. An cutout step 15 of the knuckle member 2a is engaged with a projection 18 of the knuckle member 2b while a projection 17 of the knuckle member 2a is engaged with a cutout step 16 of the knuckle member 2b. An cutout step 15 of the knuckle differs from the height of the projection 18, and thus a clearance is formed therebetween for firmly clamping the annular seal 3. By mounting the annular seal 3 on the knuckle 2 in this manner, the annular seal 3 is disposed obliquely to cross the axis connecting king-pin bearings 19 mounted around the king-pins 4. Therefore, since either of the upper and lower king-pins 4 is exposed to the outside of the annular seal 3, a king-pin seal 6 is disposed around the exposed king-pin bearings 19.

Figure 5A:
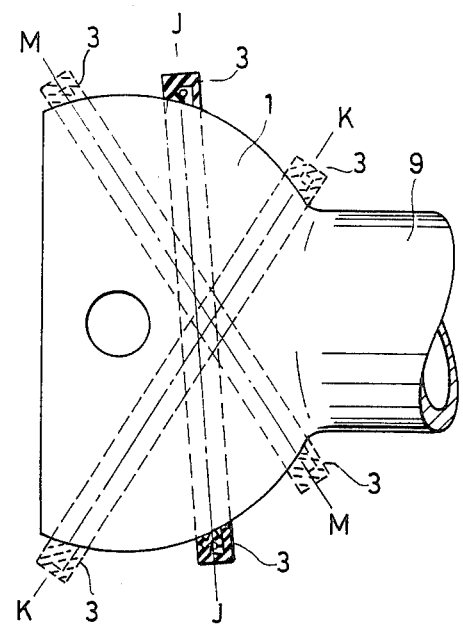
FIG. 5A is an illustration of the relationship between the hollow spherical portion of the tubular axle in the joint structure for an axle and the annular seal on the knuckle in accordance with the present invention.
Figure 5B:
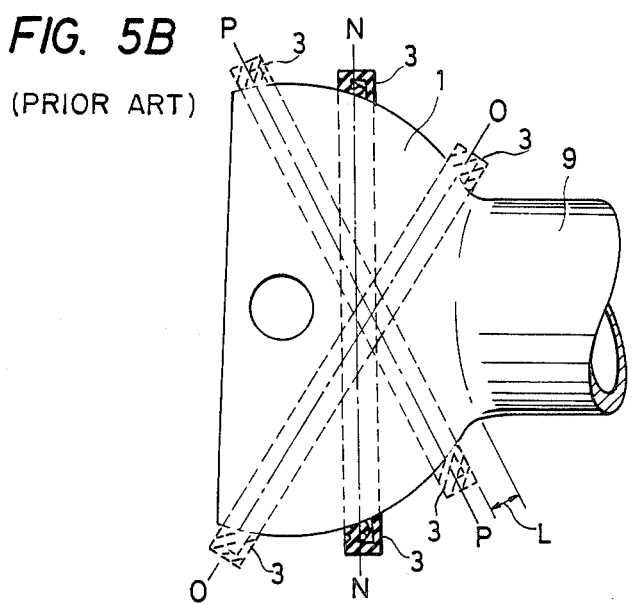
FIG. 5B is an illustration of the relationship between the hollow spherical portion of the tubular axle in the joint structure for an axle housing ball-end and the annular seal on the knuckle in accordance with the prior art.
Figure 6:
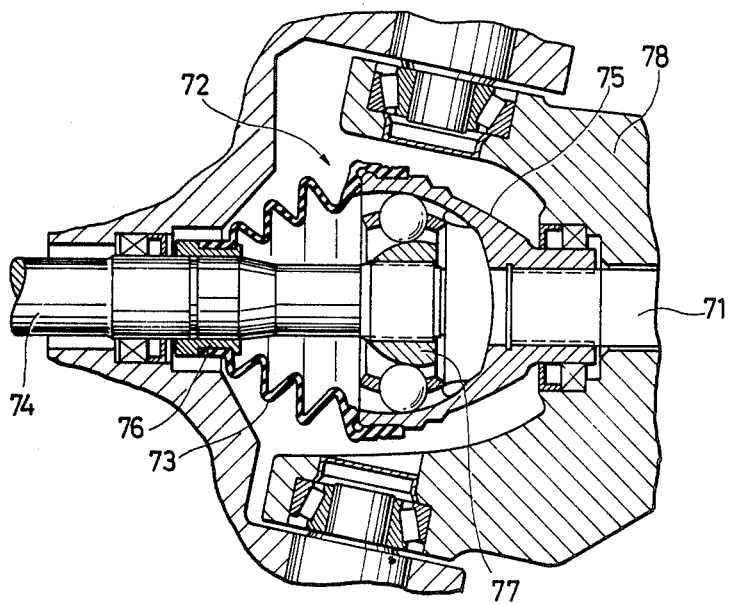
FIG. 6 is a cross-sectional view of a joint structure for an axle in accordance with the prior art.

Referring to FIGS. 5A and 5B, description will be made in connection with an arrangement wherein the annular seal 3 is inclined with respect to the hollow spherical portion 1, that is, a mounting structure in which the annular seal 3 is inclined with respect to the hollow spherical portion 1.

As shown in FIGS. 5A and 5B, the hollow spherical portion 1 is integral with the tubular axle 9.

In FIG. 5B, there is shown the relation between the annular seal 3 fitted to the knuckle and the hollow spherical portion 1 formed at the end of the tubular axle 9 in the conventional joint structure of the axle. In this case, an embodiment in which an angle at which the annular seal 3 is mounted is not inclined as in the case of the prior art, that is, the predetermined angle $\theta$ is 0°, with the annular seal 3 corresponding to positions N, O and P. The position N of the annular seal 3 corresponds to a steering angle of 0°, the position O of the annular seal 3 corresponding to the maximum steering angle of a wheel on the inner side of a curve, that is, a case wherein the maximum steering angle of the wheel on the inner side is 34°, and the position P of the annular seal 3 coresponding to the maximum steering angle of a wheel on the outer side of the curve, that is, a case where the maximum steering angle of the wheel on the outer side is 27°. If the seal mounting angle is 0° in this manner, when the annular seal 3 is mounted, the spherical surface of the hollow spherical portion 1 cannot be utilized from end to end, that is, it is impossible completely to utilize the entire range continuing to a position at which the annular seal 3 comes into contact with the tubular axle 9. Accordingly, although there is a margin equivalent to a length indicated by symbol L on the hollow spherical portion 1, the marging cannot be covered. In other words, the N position of the annular seal 3 is up to the O position in terms of a steering angle of the wheel on the inner side but generally, there is still the allowance of the steering angle capacity of the constant-velocity joint. Therefore, the steering angle can be increased by inclining the annular seal 3 by a predetermined angle in such a manner as to let the annular seal 3 come closer to the P position from the N position and to increase the moving distance of the annular seal 3 from the N position to the O position. In terms of the steering angle of the wheel on the outer side in this case, however, since the N position of the annular seal 3 comes closer to the P position, there is no sliding surface (corresponding to the upper portion of FIG. 3B) on the spherical surface of the hollow spherical portion 1 formed at the end of the tubular axle 9 and the annular seal 3 protrudes out from the slide surface. Moreover, according to the conventional disposition, since the tip of the hollow spherical portion 1 butts against the outer race of the constant-velocity joint, the slide surface of the annular seal of the hollow spherical portion 1 cannot be extended so that the annular seal 3 cannot be brought closer to the P position from the N position. Therefore, a structure wherein the constant-velocity joint does not interfere even when the slide surface for the steering angle of the wheel on the outer side is increased has been desired.

Next, in FIG. 5A, there is shown the relation between the annular seal 3 and the hollow spherical portion 1 in the joint structure of the axle in accordance with the present invention. The annular seal 3 is clamped between the knuckle members 2a and 2b of the knuckle 2, the annular seal 3 being located at positions J, K and M.

FIG. 5A shows an embodiment in which the mounting angle of the annular seal 3, that is, the predetermined angle $\theta$ is, for example, about 4°. The position J of the annular seal 3 corresponds to a steering angle of 0°, the position K of the annular seal 3 corresponding to the maximum steering angle of the wheel on the inner side, that is, a steering angle of 38°, and the position M of the annular seal 3 corresponding to the maximum steering angle of the wheel on the outer side, that is, a steering angle of 30°. When the annular seal 3 is mounted, if the seal mounting angle is inclined at about 4°, the slide distance of the annnular seal 3 on the side of the steered wheel on the inner side can be enlarged effectively to utilize the whole spherical surface of the hollow spherical portion 1. In other words, as shown in FIG. 1, the disposition of the constant-velocity joint 12 is reverse to the conventional disposition. The outer race of the constant-velocity joint 12 is coupled to the axle shaft 5 and since the drive shaft 25 having a reduced diameter is positioned on the side of the wheel 24, the tip of the hollow spherical portion 1 which is formed at the end of the tubular axle 5 can extend on the annular seal slide surface (the portion corresponding to the upper portion of FIG. 5A) of the hollow spherical portion 1 on the steering angle side of the wheel on the outer side without interferring with the outer face of the constant-velocity joint 12, and the slide surface of the annular seal 3 on the steering angle side of the wheel on the outer side can be thus secured. Therefore, as described above, it is possible to increase the maximum steering angle of the wheel on the inner side by inclining the N position of the annular seal 3 towards the P position and setting the position of the annular seal 3 to the J position so as to increase the moving distance of the annular seal 3 from the J position to the K position, and at the same time, to increase the maximum steering angle of the wheel on the outer side by increasing the moving distance of the annular seal 3 from the J position to the M position. Moreover, even when the annular seal 3 is slid from the J position to the M position, the annular seal 3 does not protrude from the slide surface of the hollow spherical portion 1.

One embodiment of the joint structure for an axle in accordance with the present invention is constructed as described above. However, it will be readily understood by those skilled in the art that this invention is not confined solely to the structure described above in detail. For example, the following structure may be applied.

Another example of the inclined annular seal 3 mounted on the knuckle 2 will be described below with reference to FIGS. 4A, 4B and 4C. Although the knuckle 2 is not divided in the accompanying drawings, it will be appreciated that the technical concept on which the knuckle 2 is inclined at a predetermined angle can be applied to the two-piece knuckle 2.

Figure 4A:
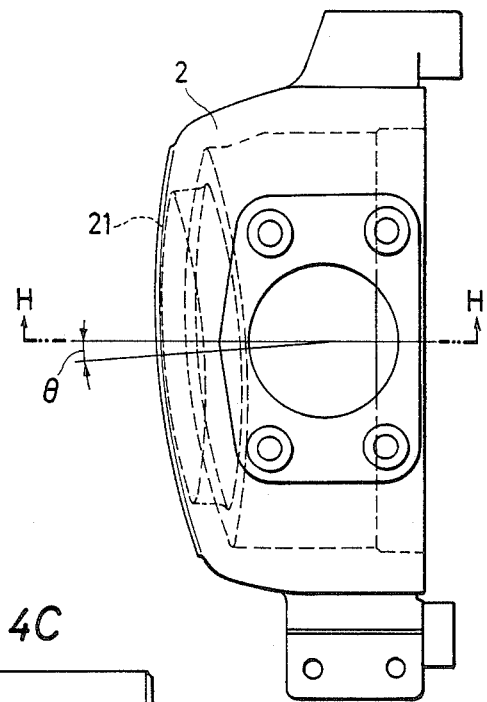
FIG. 4A is a top plan view of the knuckle mounted on an axle casing showing another embodiment of the joint structure for an axle, which is applied to a driving axle structure with a steering device in accordance with the present invention.
Figure 4B:
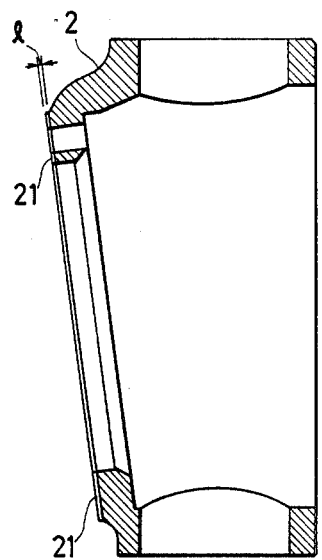
FIG. 4B is a cross-sectional view taken along line H—H of FIG. 4A.
Figure 4C:
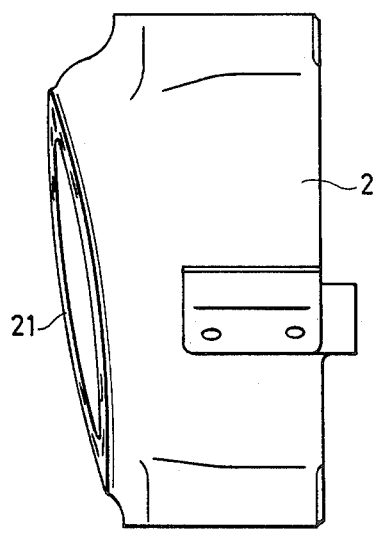
FIG. 4C is a front elevational view taken in the direction of an arrow G of FIG. 4A.

Referring to FIGS. 4A, 4B and 4C respectively showing a first preferred embodiment of a joint structure for an axle in accordance with the present invention, a knuckle 2 mounted on an axle casing 20 is schematically illustrated. FIG. 4A is a top plan view of the knuckle 2, in which a mounting surface 21 of the knuckle 2 mounted on the hollow axle casing 20 is inclined at a predetermined angle $\theta$, for example, about 4° with respect to the axis of an axle, that is, the horizontal axis of the hollow axle casing 20. FIG. 4B shows the abutting surface 21 of the knuckle 2 which is inclined at the predetermined angle $\theta$, for example, about 4° with respect to the axis of the hollow axle casing 20, and therefore is biased a distance l, for example, a distance of about 2 mm. FIG. 4C, shows for abutting surface 21 of the knuckle 2 which is inclined at the predetermined angle $\theta$.

For example, it will be appreciated that it is possible to adopt a structure in which the annular seal is disposed on a knuckle per se, instead of the arrangement in which the annular seal is clamped between a pair of knuckle members of the two-piece knuckle. As an example, the seal may be disposed in a groove formed in the inner circumference of the knuckle.

Even in a conventional structure, if the arrangement of the constant-velocity joint is reversed such that the front side of the seal mounting surface is inclined inwardly of a vehicle with the rear side outwardly of the same, the difference between the steering angles of the wheels on the inner and outer sides in the Ackerman steering mechanism is suitably distributed between the areas of the seal slide surfaces corresponding to the respective wheels, thereby increasing the steering angle of the wheel on the inner side, so that the turning radius of the vehicle can be reduced.

Referring to a method of inclining the seal mounting surface, the inclination of the surface of a knuckle to be worked provides the advantage that it is unnecessary to prepare a seal of a special shape. The structure of this invention has the potential of achieving the steering angles 40°, 40° of wheels by disposing the seal in an obliquely crossed manner with respect to the axis connecting the king-pins. Therefore, where a difference is to be formed between the steering angles of the wheels on the inner and outer sides in the Ackerman steering mechanism, a caster angle equivalent to half the difference is formed, and in addition each terminal end of the follow spherical portion of the tubular axle is inclined by half of the angle difference in order to prevent the occurence of unwanted interference. By these measures, as an example, it is possible to obtain large steering angles such as 45° and 35°. As a matter of course, although the built-in constant-velocity joints need ability responsive to these steering angles, constant-velocity joints generally have such ability as a part of their own functions.

I claim:

1. In a joint structure for an axle comprising: a non-rotatable tubular axle extending in the transverse direction of a car; a hollow spherical portion having a spherical surface formed at the end portion of said tubular axle; a non-rotatable hollow axle casing disposed on a wheel side; a knuckle mounted to the end surface of said axle casing; a pair of king-pins fitted to said hollow spherical portion and supporting rotatably said knuckle on said spherical surface of said hollow spherical portion; an annular seal fitted to said knuckle and coming into sliding contact with said spherical surface of said hollow spherical portion; and a constant-velocity joint connecting an axle shaft supported rotatably inside said tubular axle to a drive shaft disposed rotatably inside said axle casing, and disposed inside the space defined by said hollow spherical portion, said knuckle and said axle casing;

a joint structure for an axle wherein an outer race of said constant-velocity joint is coupled to an end of the axle shaft, and that said annular seal is fitted to said knuckle in such a manner as to cross the axis of each of said king pins.

2. A joint structure for an axle according to claim 1, wherein said knuckle consists of a knuckle portion supported rotatably by said king-pin on the upper side and a knuckle portion supported rotatably by said king-pin on the lower side.

3. A joint structure for an axle according to claim 1, wherein the fitting position of said seal is substantially the largest diameter position of said hollow spherical portion of said tubular axle.

4. A joint structure for an axle according to claim 2, wherein said seal is clamped between said knuckle portion supported rotatably by said king-pin on the upper side and said knuckle portion supported rotatably by said king-pin on the lower side.

* * * * *